United States Patent [19]

Hovland

[11] 3,973,084
[45] Aug. 3, 1976

[54] ELECTRIC IMPULSE TRANSMITTERS FOR TELEPHONE INSTRUMENTS

[76] Inventor: Per Jorgen Hovland, 72 Aln St., County Durham, Hebburn, England

[22] Filed: Jan. 14, 1975

[21] Appl. No.: 540,885

[30] Foreign Application Priority Data
Jan. 15, 1974 United Kingdom............. 1800/74

[52] U.S. Cl. .............................................. 179/90 K
[51] Int. Cl.² .................................................. H04M 1/44
[58] Field of Search ............. 179/90 R, 90 B, 90 K, 179/90 BB

[56] References Cited
UNITED STATES PATENTS

| | | | |
|---|---|---|---|
| 3,601,552 | 8/1971 | Barnaby et al. ............... | 179/90 B |
| 3,787,639 | 1/1974 | Battrick ............................ | 179/90 K |
| 3,856,982 | 12/1974 | Lawson et al. .................... | 179/90 K |
| 3,879,584 | 4/1975 | McCabe et al. ................... | 179/90 K |

*Primary Examiner*—Kathleen H. Claffy
*Assistant Examiner*—Gerald L. Brigance
*Attorney, Agent, or Firm*—Kirschstein, Kirschstein, Ottinger & Frank

[57] ABSTRACT

In a telephone subscriber's circuit with provision for push-button dialling using a circuit that is powered by line current, a transistor switch is provided in place of conventional impulsing contacts.

4 Claims, 1 Drawing Figure

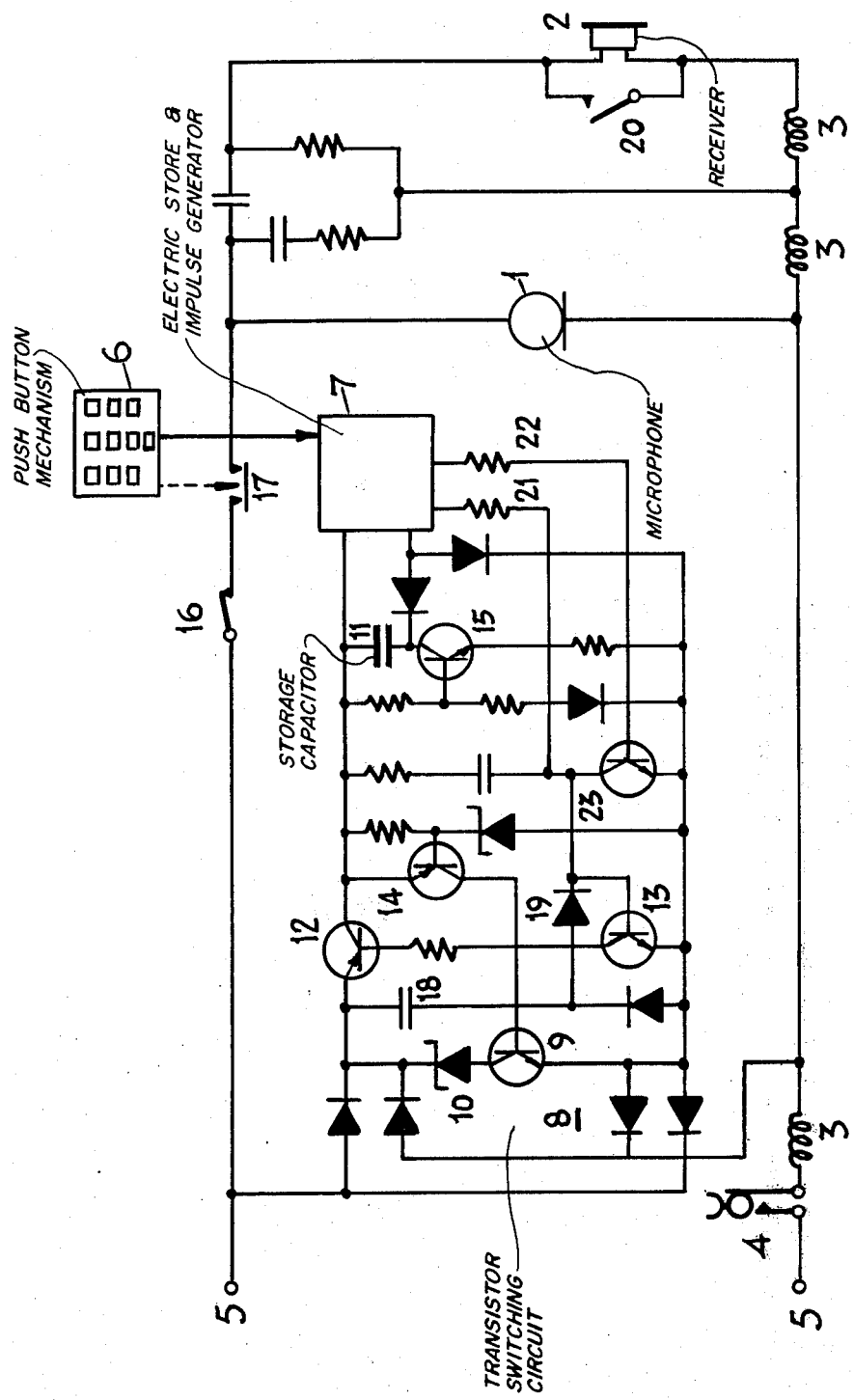

ELECTRIC IMPULSE TRANSMITTERS FOR TELEPHONE INSTRUMENTS

The present invention relates to electric impulse transmitters for telephone instruments.

According to the present invention in an electric impulse transmitter for a telephone instrument including electric storage means for storing digit values of a telephone number to be signalled over a telephone line associated with the instrument, the digit values being signalled by alternately making and breaking within the telephone instrument of a loop circuit including said telephone line, there are provided an electric impulse generator for generating trains of impulses in respect of digit values held in said storage means, transistor switching means the major current path of which is arranged to be connected in said loop circuit and which is arranged to effect said making and breaking of said loop circuit in dependence upon output signals from said impulse generator, and electric circuit means connected effectively in parallel with the major current path of said transistor switching means to derive energising current for at least the electric storage means from an exchange source by way of said telephone line during loop-make periods.

The major current path of the transistor switching means may comprise a zener diode in series with the emitter-collector path of a junction transistor. The transistor switching means may include a second transistor connected in series with the electric circuit means across said major current path, the first-mentioned and the second transistors being arranged to be conducting and non-conducting in unison. The electric circuit means may comprise a storage capacitor in series with a substantially constant current transistor circuit, the capacitor being arranged to be charged towards the voltage which is developed across the major current path of the transistor switching means during the loop-make periods.

A telephone instrument incorporating an electric impulse transmitter in accordance with the present invention will now be described by way of example with reference to the accompanying drawing, which shows the electric circuit of the instrument diagrammatically.

Referring to the drawing the telephone instrument comprises a microphone 1, a receiver 2 and an induction coil 3 which are connected by way of gravity switch contacts 4 to a pair of line terminals 5 for connection to a telephone line (not shown). A conventional regulator (not shown) may be provided, and a bell (not shown) may be arranged to be connected between the terminals 5 by means of further gravity switch contacts (not shown).

The instrument also comprises a pushbutton mechanism 6 by means of which decimal digit values of a telephone number to be called may be entered in an electric storage and impulse generator circuit 7, digit values entered in the circuit 7 subsequently being signalled in turn to associated exchange equipment by means of a transistor switching circuit 8, which is arranged alternately to make and break a line looping path between the terminals 5 in a similar manner to a conventional rotary dial mechanism. An electric storage and impulse generating circuit such as the circuit 7 for use with a pushbutton mechanism in an electric impulse transmitter for a telephone instrument is described for example in U.S. Pat. No. 3,601,552.

The transistor switching circuit 8 comprises a high-voltage n-p-n transistor 9 which is connected in series with a zener diode 10 across one diagonal of a bridge of diodes 8 the other diagonal of which is connected between the line terminals 5. Connected effectively in parallel with the transistor 9 and zener diode 10 across the diode bridge is a network having the functions of controlling the conductive state of the transistor 9 and controlling the charging of a storage capacitor 11 from an exchange source by way of the associated telephone line. This network comprises a further high-voltage transistor 12 the conductive state of which is controlled by a transistor 13 and which in turn controls the state of a transistor 14 whose collector electrode is connected to the base electrode of the transistor 9. A constant current charging circuit for the capacitor 11, comprising a transistor 15 and its associated biasing network, is connected in series with the collector-emitter path of the transistor 12 across the diode bridge.

The storage capacitor 11 serves as a secondary source or power reservoir for energising the circuit 7 during impulsing, the capacitor 11 being charged during loop-make intervals to sustain operation of the circuit 7 during loop-break intervals.

When the telephone instrument is taken into use and the gravity-switch contacts 4 close, energising current from the exchange source flows to the microphone 1 by way of a normally closed off-normal contact 16 and a normally closed contact 17 which is arranged to be operated in common with any one of the push buttons of the mechanism 6. The transistors 9 and 12 are initially unbiased and draw very little current. As soon as one of the pushbuttons is operated, however, the tendency for the voltage between the terminals 5 to rise biases the transistor 13, and hence the transistor 12 into conduction by current flowing into a capacitor 18 by way of a diode 19 and the base-emitter path of the transistor 13. Consequently the current flow from the exchange source is diverted to charge the capacitor 11 and energise the storage and impulse generating circuit 7. Once this latter circuit is in operation the digit value selected by the operation of the pushbutton is entered in the storage circuit, whereupon the contacts 16 are arranged to open, a set of make contacts 20 are arranged to close to short circuit receiver 2, and a forward bias voltage is applied from the circuit 7 to the base electrode of the transistor 13 by way of a resistor 21. The contacts 16 and 20 remain operated and the forward bias is maintained so long as the selected digit value or any subsequently selected digit value, or any part of a digit value, remains in the storage circuit. The forward bias for the transistor 13 holds this transistor and the transistor 12 in a conducting condition, so that current continues to flow to the capacitor 11 and the circuit 7, and by way of the transistor 14 holds the transistor 9 in conduction.

The transistor 9, which is selected for its ability to withstand relatively high voltages applied between its collector and emitter electrodes, when fully conducting may still drop up to five volts between these two electrodes, so that with the voltage drop across the zener diode 10 a voltage of, say, eight volts is developed across the one diagonal of the diode bridge for charging the capacitor 11 and energising the circuit 7.

When the impulse generator in the circuit 7 generates one or more loop-break pulses characterising the digit value selected, these pulses are applied as forward bias pulses by way of a resistor 22 to a transistor 23 whereby the forward bias for the base electrode of the transistor 13 is shorted, so that this transistor and the transistors 12, 14 and 9 become non-conducting for the duration of each loop-break pulse.

I claim:
1. An electric impulse transmitter for a telephone instrument comprising:
   A. electric storage means for storing digit values of a telephone number to be signalled over a telephone line associated with the instrument,
      I. the digit values being signalled by alternately making and breaking within the telephone instrument of a loop circuit including said telephone line,
   B. an electric impulse generator for generating trains of impulses in respect of said digit values,
   C. transistor switching means
      I. the major current path of which is arranged to be connected in said loop circuit
         a. to effect said making and breaking of said loop circuit in dependence upon output signals from said impulse generator, and
   D. electric circuit means
      I. connected in parallel with the major current path of said transistor switching means
      II. to derive energizing current for at least the electric storage means
         a. from an exchange source by way of said telephone line
         b. during loop-make periods.

2. An electric impulse transmitter in accordance with claim 1 wherein the major current path of the transistor switching means comprises a zener diode in series with the emitter-collector path of a junction transistor.

3. An electric impulse transmitter in accordance with claim 2 including a second transistor connected in series with the electric circuit means across said major current path and means to bias said first-mentioned and second transistors to be conducting and non-conducting in unison.

4. An electric impulse transmitter in accordance with claim 1 wherein the electric circuit means comprises a storage capacitor in series with a substantially constant current transistor circuit, the capacitor being arranged to be charged towards the voltage which is developed across the major current path of the transistor switching means during the loop-make periods.

* * * * *